United States Patent
Fujukawa et al.

(10) Patent No.: US 6,821,412 B1
(45) Date of Patent: Nov. 23, 2004

(54) CATALYST FOR HYDROTREATING OF GAS OIL AND METHOD FOR HYDROTREATING OF GAS OIL

(75) Inventors: Takashi Fujukawa, Satte (JP); Hiroshi Kimura, Satte (JP); Hirofumi Mizuguchi, Satte (JP); Hideki Godo, Satte (JP)

(73) Assignee: Cosmo Oil Co., Ltd., Tokyo (JP)

( * ) Notice: Subject to any disclaimer, the term of this patent is extended or adjusted under 35 U.S.C. 154(b) by 0 days.

(21) Appl. No.: 10/070,235

(22) PCT Filed: Aug. 24, 2000

(86) PCT No.: PCT/JP00/05707

§ 371 (c)(1),
(2), (4) Date: Feb. 28, 2002

(87) PCT Pub. No.: WO01/15805

PCT Pub. Date: Mar. 8, 2001

(30) Foreign Application Priority Data

Aug. 30, 1999 (JP) .......................... 11/243190
Aug. 30, 1999 (JP) .......................... 11/243191

(51) Int. Cl.[7] .......................... C10G 65/04; B01J 23/40; B01J 21/04

(52) U.S. Cl. .................. 208/210; 208/213; 208/216 R; 208/217; 502/325; 502/332; 502/333; 502/334; 502/339

(58) Field of Search ................. 208/210, 213, 208/216 R, 217; 502/325, 332, 333, 334, 339

(56) References Cited

U.S. PATENT DOCUMENTS

| 2,838,444 | A | * | 6/1958 | Teter et al. .................. 208/138 |
| 3,268,295 | A | * | 8/1966 | Armbrust et al. ............ 423/625 |
| 3,943,053 | A | | 3/1976 | Kovach et al. |
| 4,066,740 | A | * | 1/1978 | Erickson ...................... 423/628 |
| 4,145,276 | A | | 3/1979 | Cosyns et al. |
| 6,042,716 | A | * | 3/2000 | Morel et al. .................. 208/89 |

FOREIGN PATENT DOCUMENTS

| EP | 0 849 350 A1 | 6/1998 |
| EP | 0 955 090 A1 | 11/1999 |
| JP | 10-180112 A | 7/1998 |
| JP | 10-180112 | 7/1998 |
| JP | 10-183144 | 7/1998 |
| JP | 10-235198 A | 9/1998 |
| JP | 10-235198 | 9/1998 |
| JP | 11-189776 | 7/1999 |
| JP | 2000-51703 | 2/2000 |

OTHER PUBLICATIONS

International Search Report.
Supplementary European Search Report dated Jun. 23, 2003.
Partial European Search Report dated Mar. 27, 2003.

* cited by examiner

Primary Examiner—Walter D. Griffin
(74) Attorney, Agent, or Firm—Sughrue Mion, PLLC

(57) ABSTRACT

A catalyst for hydrotreatment of gas oil containing defined amounts of platinum, palladium, and in a support of an inorganic oxide containing a crystalline alumina having a crystallite diameter of from 20 to 40 Å. A method for hydrotreating gas oil containing an aromatic compound in the presence of the above catalyst at defined conditions. A method for catalytically hydrotreating gas oil (b.p. 160–400° C.) or blend oil, in a first desulfurization step at defined conditions using a catalyst with at least one Group 6a and Group 8 metal in a support of an inorganic oxide to regulate to a defined sulfur-containing compound content, and then carrying a second desulfurization step by catalytic reaction of the oil at defined conditions using a catalyst of platinum, palladium, and halogen with a support containing an alumina.

14 Claims, No Drawings

CATALYST FOR HYDROTREATING OF GAS OIL AND METHOD FOR HYDROTREATING OF GAS OIL

TECHNICAL FIELD

The present invention relates to a catalyst for hydrotreatment of gas oil and a method for hydrotreating gas oil. More particularly, the present invention relates to a method for obtaining gas oil having a sulfur content of 10 ppm or lower from a feedstock oil which is straight-run gas oil or blend oil comprising the straight-run gas oil and at least one other hydrocarbon oil.

BACKGROUND ART

Recently, there is a global trend toward stricter quality regulation values for gas oil so as to improve the atmospheric environment. In part of the north-European countries, a quality regulation for gas oil has already been strengthened so as to include a sulfur content of 50 ppm or lower and an aromatic content of 5% or lower. Such strengthened regulations are expected to become even stricter in the future.

In our country also, the regulation for gas oil is expected to be strengthened in the near future so as to include a sulfur content of 50 ppm or lower.

Sulfur content in gas oil is regarded as the primary property to be more strictly regulated, because there is a fear that the sulfur may adversely influence the durability of after-treatment technologies expected as the countermeasure against the diesel exhaust gas, such as oxidation catalysts, nitrogen oxide ($NO_x$) reduction catalysts, and diesel particulate filters.

For the reasons given above, there is a desire for a further sulfur content reduction in gas oil, and the conventional deep desulfurization techniques and ultra-deep desulfurization techniques are required to be further improved.

A subject in the ultra-deep desulfurization of gas oil is how to efficiently remove heavy refractory sulfur-containing compounds unsusceptible to desulfurization, such as 4,6-dimethyldibenzothiophene (4,6-DMDBT).

It is thought that the reason why those substances are less apt to be desulfurize is that the alkyl substituents are located near the sulfur atom and hence cause a steric hindrance when the molecule comes into contact with an active site of a catalyst.

Consequently, an important subject in efficiently carrying out a desulfurization reaction in an ultra-deep desulfurization region is to design catalysts which enable the desulfurization of such substances having a steric hindrance to desulfurization-active sites to proceed efficiently and how to use these catalysts, namely, how to design a desulfurization process using these catalysts.

In addition, in view of the recent economic situation in the world including our country, it is of urgent necessity to design a catalyst or process which enables the deep desulfurization or ultra-deep desulfurization such as those described above to be carried out at a lower cost.

One technology for this cost reduction is catalyst regeneration. To develop a catalyst capable of being repeatedly regenerated and to develop a regeneration technology giving a regenerated catalyst having the same performance as the fresh catalyst also are important subjects.

DISCLOSURE OF THE INVENTION

An object of the present invention, in view of the points described above, is to provide a catalyst for hydrotreatment which can highly desulfurize straight-run gas oil so as to have a sulfur content of 10 ppm or lower.

Another object of the present invention is to provide a method for hydrotreating a gas oil fraction at a high efficiency using the catalyst described above.

Still another object of the present invention is to provide a method by which the catalyst described above can be converted to a regenerated catalyst.

The present invention relates to the following (1) to (15).

(1) A catalyst for hydrotreatment of gas oil, comprising from 0.1 to 10% by weight platinum, from 0.1 to 20% by weight palladium, and from 0.05 to 1.2% by weight halogen in terms of the respective elements based on the catalyst in a support comprising an inorganic oxide containing an alumina, wherein the alumina comprises a crystalline alumina having a crystallite diameter of from 20 to 40 Å.

(2) The catalyst according to (1), wherein the weight ratio between the platinum and the palladium is from 0.5 to 0.8 in terms of (palladium)/(palladium+platinum) ratio.

(3) The catalyst according to (1) or (2), wherein the support contains at least one inorganic oxide selected from silica, boria, titania, and zirconia in an amount of from 5 to 60% by weight.

(4) The catalyst according to any one of (1) to (3), which has an acid amount as determined by the ammonia-TPD (temperature programmed desorption) method of from 0.4 to 3 mmol/g.

(5) The catalyst according to any one of (1) to (4), wherein the metal dispersion degree of the catalyst as determined by the CO pulse method after a hydrogen reduction treatment is from 40 to 100%.

(6) A method for hydrotreating gas oil, comprising carrying out a catalytic reaction of a gas oil fraction containing an aromatic compound in the presence of the catalyst according to any one of claims 1 to 5 at a hydrogen partial pressure of from 3 to 8 MPa, a temperature of from 200 to 370° C., a liquid hourly space velocity of from 0.3 to 5.0 $h^{-1}$, and a hydrogen/oil ratio of from 100 to 1,000 L/L.

(7) A method for hydrotreating gas oil, comprising:

carrying out, as a first desulfurization step, a catalytic reaction of straight-run gas oil having a boiling point of from 160 to 400° C. or blend oil comprising the straight-run gas oil and at least one other hydrocarbon oil at a hydrogen partial pressure of from 3 to 7 MPa, a temperature of from 200 to 400° C., a liquid hourly space velocity of from 0.5 to 5.0 $h^{-1}$, and a hydrogen/oil ratio of from 100 to 1,000 L/L in the presence of a catalyst comprising from 10 to 25% by weight at least one metal selected from the Group 6a of the periodic table and from 0.1 to 6% by weight at least one metal selected from the Group 8 of the periodic table in terms of the respective oxides based on the catalyst in a support comprising an inorganic oxide to thereby regulate the oil so as to have a sulfur-containing compound content of 0.2% by weight or lower after the step; and then carrying out, as a second desulfurization step, a catalytic reaction of the oil after the first desulfurization step at a hydrogen partial pressure of from 3 to 8 MPa, a temperature of from 150 to 370° C., and a liquid hourly space velocity of from 0.3 to 5.0 $h^{-1}$ in the presence of a catalyst comprising from 0.1 to 10% by weight platinum, from 0.1 to 20% by weight palladium, and from 0.05 to 1.2% by weight halogen in terms of the respective elements based on the catalyst in a support comprising an inorganic oxide containing an alumina.

(8) The method according to (7), wherein after the first desulfurization step, the oil is subjected to a degassing step.
(9) The method according to (7) or (8), wherein the alumina contained in the support of the catalyst for use in the second desulfurization step comprises a crystalline alumina having a crystallite diameter of from 20 to 40 Å.
(10) The method according to any one of (7) to (9), wherein in the catalyst for use in the second desulfurization step, the weight ratio between the platinum and the palladium is from 0.5 to 0.8 in terms of (palladium)/(platinum+palladium) ratio.
(11) The method according to any one of (7) to (10), wherein the support of the catalyst for use in the second desulfurization step contains at least one inorganic oxide selected from silica, boria, titania, and zirconia in an amount of from 1 to 60% by weight.
(12) The method according to any one of (7) to (11), wherein the catalyst for use in the second desulfurization step has an acid amount as determined by the ammonia-TPD method of from 0.4 to 3 mmol/g.
(13) The method according to any one of (7) to (12), wherein the catalyst for use in the second desulfurization step, after a hydrogen reduction treatment, has a metal dispersion degree as determined by the CO pulse method of from 40 to 100%.
(14) The method according to any one of (7) to (13), wherein the catalyst for use in the second desulfurization step is one regenerated by carrying out a reaction for coke deposit removal at an air partial pressure of from 0.05 to 5 MPa and a temperature of from 200 to 800° C.
(15) The method according to any one of (7) to (14), wherein the catalyst for use in the second desulfurization step is one regenerated by carrying out a reaction for coke deposit removal at an air partial pressure of from 0.05 to 5 MPa and a temperature of from 200 to 800° C. and then carrying out a treatment for highly dispersing an active metal in the presence of a chlorine compound at a temperature of from 200 to 800° C.

BEST MODE FOR CARRYING OUT THE INVENTION

The following have been found to be effective in attaining a sulfur content of 10 ppm or lower: (i) it has first been found that when the alumina used as the support of a catalyst comprises a crystalline alumina, then the catalyst sufficiently attacks sulfur-containing compounds unsusceptible to desulfurization; and (ii) it has then been found as a result of intensive investigations on this kind of crystalline alumina that the crystalline alumina effective in attaining that sulfur content is one which has a crystallite diameter within a specific range.

The catalyst of the present invention is suitable for hydrotreatment of hydrocarbon oil, especially gas oil fractions, for example, for hydrotreatment of light cycle oil, straight-run gas oil, thermally light cycle oil, hydrotreated gas oil, desulfurized gas oil, and the like.

Typical examples of properties of such feedstock oil include a boiling point of from 150 to 450° C., a sulfur content of 2,000 ppm or lower, preferably 500 ppm or lower, and an aromatic content of from 5 to 90% by volume.

The support of the catalyst of the present invention comprises an inorganic oxide containing an alumina as the main component. As this alumina can be used various aluminas, such as α-alumina, β-alumina, γ-alumina, δ-alumina and the like. However, an alumina which is porous and has a large specific surface area is preferred. In particular, γ-alumina is suitable.

Although aluminas contain unavoidable impurities, these unavoidable impurities are excluded from those inorganic oxides.

It is important that the alumina should comprise a crystalline alumina (substantially γ-alumina) and this crystalline alumina should have a crystallite diameter of from 20 to 40 Å.

When the crystallite diameter is regulated to 20 Å or larger, the support (alumina composite oxide) has crystallinity and the catalyst has an appropriate pore diameter. Consequently, sulfur-containing compounds, especially sulfur-containing compounds unsusceptible to desulfurization such as 4,6-dimethyldibenzothiophene, sufficiently diffuse into the pores of the catalyst, resulting in improved desulfurization performance.

On the other hand, when the crystallite diameter is regulated to 40 Å or smaller, the support (alumina composite oxide) has crystallinity and the catalyst has an appropriate pore diameter. Consequently, the catalyst has a sufficient surface area and the active metals diffuse sufficiently, resulting in improved desulfurization activity.

Namely, by precisely regulating the crystallite diameter of the crystalline alumina to 20 to 40 Å, a catalyst pore distribution which brings about the maximum of desulfurization activity can be formed.

Crystallite diameter is calculated using the Scherrer equation (1) from the half-value width of the peak at $2\theta=67°$ based on the results of an examination by x-ray diffractometry. As a reference material is used a silicon powder.

$$Dnkl = K\lambda/\beta \cos\theta \quad (1)$$

$$\beta = B - b$$

Dnkl: crystallite diameter (Å)
$\lambda$: wavelength of measuring X-ray (Å) ($CuK_{\alpha 1}=1.54060$ Å)
$\beta$: spread of diffracted line due to crystallite size and lattice diameter ($2\theta$) (radian)
B: spread of diffracted line due to optical system and sample ($2\theta$) (radian)
b: spread of profile due to optical system ($2\theta$) (radian)
$\theta$: Bragg angle of diffracted line (radian)
K: constant (0.9)

With respect to the inorganic oxides other than aluminas (hereinafter referred to as minor support components), the first group thereof includes silica, boria, titania, zirconia, magnesia, hafnia, ceria, yttria, niobia, chromia, thoria, and the like. These are used alone or in combination of two or more thereof.

The second group of minor support components includes crystalline inorganic oxides such as zeolites and molecular sieves, clay minerals such as montmorillonite, kaolins, bentonites, saponite, etc. These are used alone or in combination of two or more thereof.

The third group of minor support components includes inorganic oxides obtained by activating specific metal oxides such as zirconia and titania with sulfate ions, e.g., $SO_4/ZrO_2$, $SO_4/TiO_2$, and the like. These are used alone or in combination of two or more thereof.

It is possible to use two or more members arbitrarily selected from the above three groups of minor support components (for example, to use a combination of silica in the first group with $SO_4/ZrO_2$ in the third group).

Among the minor support components, silica, boria, titania, and zirconia are more preferable. It is preferred to use inorganic oxides containing one of these or a combination of two or more of these in an amount of from 5 to 50% by weight.

The content of the minor support components in the support is from 5 to 50% by weight, preferably from 10 to 40% by weight, in terms of oxides based on the support.

The support, which is constituted of an alumina and minor support components, is not particularly limited in specific surface area, pore volume, and average pore diameter. However, from the standpoint of enabling the catalyst to have excellent sulfur tolerance and high activity in the hydrogenation and desulfurization of hydrocarbon oil, suitable properties of the support include a specific surface area of from 100 to 600 m$^2$/g, preferably from 200 to 400 m$^2$/g, a pore volume of from 0.4 to 1.2 ml/g, and an average pore diameter of from 50 to 200 Å, preferably from 50 to 150 Å. Specific surface area herein is expressed in terms of BET specific surface area (Braunauer-Emmett-Tailor surface area) and measured by the BET method.

This support preferably has an acid amount as determined by the ammonia-TPD method of from 0.6 to 3.5 mmol/g.

The active ingredients to be deposited on the support described above are at least one compound of platinum and at least one compound of palladium. Examples thereof include chlorometallic acid salts, chlorides, nitrates, sulfates, acetates, phosphates, organic acid salts, and the like. Preferred are chlorometallic acid salts, chlorides, and nitrates.

The content of platinum, among those active ingredients, is from 0.1 to 10% by weight, preferably from 0.2 to 5% by weight, and more preferably from 0.2 to 3% by weight, in terms of the element based on the catalyst.

By regulating the platinum content to 0.1% by weight or higher, sufficient active sites attributable to platinum can be obtained. Regulation of the platinum content to 10% by weight or lower not only is effective in preventing the aggregation or the like of the platinum compound to improve the dispersion of the active metal, but also is preferred from the standpoint of cost.

The content of palladium is from 0.1 to 20% by weight, preferably from 0.2 to 15% by weight, and more preferably from 0.2 to 10% by weight, in terms of the element based on the catalyst.

By regulating the palladium content to 0.1% by weight or higher, the effects attributable to palladium can be fully exhibited. Regulation of the palladium content to 20% by weight or lower brings about an improvement in catalytic activity without covering the platinum and other active sites present on the support.

The main cause of activity decreases in noble-metal-based hydrogenation catalysts is catalyst poisoning by sulfur.

The use of a combination of platinum and palladium in the present invention is an effective means for inhibiting this activity decrease by sulfur poisoning, because it can inhibit sulfur adsorption onto the catalyst.

However, a mere combination of platinum and palladium does not give sufficient sulfur tolerance.

For attaining an improvement in the sulfur tolerance and a further improvement in catalytic activity, it is necessary to keep the proportion of platinum to palladium in a specific range.

With respect to the relationship between the proportion of platinum to palladium and the activity and sulfur tolerance of the catalyst, sufficient sulfur tolerance and sufficient catalytic activity can be obtained when the weight ratio between the platinum and the palladium is from 0.5 to 0.8 in terms of (palladium)/(palladium+platinum) ratio.

The content of the halogen deposited on the support together with those active ingredients is from 0.05 to 1.2% by weight in terms of the element based on the catalyst.

When a halide such as a chlorometallic acid salt or chloride is used as a compound of an active ingredient described above or where a halide such as hydrochloric acid is used as, e.g., a solvent ingredient in the catalyst preparation which will be described later, that halogen may be one derived from these compounds. When a compound other than halides is used or where the halogen derived from halides is insufficient, other halogen sources may be used together with this compound. Examples of such other halogen sources include chlorine, hydrochloric acid, perchloric acid, hydrofluoric acid, chlorine dioxide, stabilized chlorine dioxide solution, fluorine, hydrofluoric acid, acid ammonium fluoride, bromine, ammonium bromide, iodine, hydriodic acid, and the like.

Sulfur generally tends to accept electrons and is presumed to be less adsorbed onto electron-deficient sites. It is presumed based on this idea that when an acidic nature is imparted to a support, then electrons move from the active metals to the support, resulting in reduced sulfur adsorption. This technique is expected to bring about a considerable improvement in the sulfur tolerance of catalysts.

However, use of a substance having strongly acid sites, such as a Y-type zeolite, mordenite, or iron silicate, as a catalyst support causes the feedstock oil to be excessively cracked, resulting in a less product oil yield.

Consequently, it is important to sufficiently control the acidic nature of the support based on a combination of composite oxides and addition of a halogen.

Halogens function to improve the acidic nature of a catalyst. In a catalyst having a preferred value of acidic nature, halogens improve the dispersion of the active ingredient to bring about an optimal value of the amount of acid sites on the support. Thus, halogens accelerate the adsorption of sulfur-containing compounds and improves activity in the desulfurization of the sulfur-containing compounds.

Furthermore, the addition of halogen ions to the catalyst surface functions also to stabilize the positively charged platinum-palladium structure. Consequently, as a result of the addition of halogen ions, the platinum-palladium comes into an electron-deficient state, whereby sulfur adsorption is inhibited and high sulfur tolerance is imparted to the catalyst.

It should, however, be noted that if halogen ions are present in excess, the feedstock oil is excessively cracked, resulting in a less product oil yield.

In the catalyst comprising the ingredients described above, the acid amount as determined by the ammonia-TPD method is preferably from 0.4 to 3 mmol/g.

This ammonia-TPD method comprises packing a given amount of a sample (i.e., a support or catalyst) into an adsorption tube, carrying out a pretreatment in which the sample is heated to a given temperature in an inert gas stream over a given time period, held in the stream at that temperature for a given time period, and then cooled to room temperature over a given time period, carrying out ammonia adsorption for a given time period at room temperature and ordinary pressure, subsequently carrying out a degassing treatment in the inert gas stream at a given reduced pressure and a given temperature for a given time period, examining this sample for ammonia desorption spectrum at a given heating rate in the inert gas stream, and specifying the acid amount from the ammonia amount obtained from the spectrum.

By regulating the acid amount to 0.4 mmol/g or larger, a high degree of dispersion of the platinum-group metals can be secured and the electron density in the platinum-group metals can be reduced, whereby the effect of improving desulfurization activity and the effect of improving sulfur tolerance can be sufficiently obtained. By regulating the acid amount to 3 mmol/g or smaller, undesirable side-reactions of the feedstock oil, such as excessive cracking, can be prevented.

When the acid amount is from 0.4 to 3 mmol/g and the content of each ingredient is within the given range specified above, then the purpose of the present invention (ultra-deep desulfurization of gas oil) can be more effectively achieved.

After a hydrogen reduction treatment (the general hydrogen reduction treatment to which ordinary noble-metal catalysts are subjected before use), the catalyst described above preferably has a degree of dispersion of the active metals (platinum and palladium) as determined by the CO pulse method of from 40 to 100%.

By regulating the degree of dispersion of the active metals to 40% or higher, sufficient desulfurization activity can be obtained. The higher this degree of dispersion, the more the catalyst is preferred. The theoretical upper limit of the degree of dispersion of active metals is 100%.

The determination of the degree of dispersion of active metals by the CO pulse method is accomplished by adsorbing CO by the pulse method onto the catalyst which has undergone the hydrogen reduction treatment and determining the amount of the CO adsorbed by means of a thermal conductivity detector. Specifically, the difference between the average for CO pulses after a stationary state and the pulse area for each measurement is taken as the amount of CO adsorbed, and the stoichiometry between the CO and the active metals is assumed (CO/active metal=1) to determine the metal dispersion degree [(amount of the exposed metals)/(amount of the metals introduced)].

Furthermore, the catalyst described above is preferably one in which the Pt—Pt coordination number is larger than the Pd—Pd coordination number in EXAFS.

When the Pt—Pt coordination number is large, the catalyst has a platinum-core/palladium-shell structure and the palladium as active sites effectively functions in hydrodesulfurization reactions.

The catalyst described above can be prepared by the impregnation method in which the support described above is subjected at least once to an impregnation treatment in which the support is immersed in a solution prepared by dissolving compounds of the aforementioned active ingredients in a solvent, such as an acid, water, or an alcohol, optionally together with a halogen source to thereby deposit the active ingredients and halogen on the support.

As that solvent can be used an acid solvent such as hydrochloric acid, nitric acid, or sulfuric acid.

The impregnation treatment is followed by drying and calcining. When the impregnation treatment is carried out two or more times, each operation of impregnation treatment may be followed by drying and calcining.

Incidentally, the sequence of impregnation with a platinum compound and a palladium compound and with a halogen source is not particularly limited. The platinum compound, palladium compound, and halogen source may be infiltrated in any order or may be infiltrated simultaneously.

From the standpoint of product catalyst properties such as acidic nature and pore properties or from the standpoint of operation, it is preferred to simultaneously infiltrate those ingredients.

Examples of other preparation methods include the kneading method in which part or all of the active ingredients and, in some cases, part or all of a halogen source are mixed with a support material to be formed into a support and these ingredients are integrally molded. Examples thereof further include the coprecipitation method and the like.

The catalyst prepared by such a preparation method is not particularly limited in specific surface area, pore volume, average pore diameter, and pore diameter distribution as long as the catalyst performs its function. However, from the standpoint of enhancing activity in the hydrogenation and desulfurization of hydrocarbon oil as in the support described above, the catalyst has a specific surface area of from 100 to 600 $m^2/g$, preferably from 200 to 400 $m^2/g$, a pore volume of from 0.4 to 1.2 ml/g, preferably from 0.45 to 0.9 ml/g, an average pore diameter of from 50 to 200 Å, preferably from 50 to 150 Å, and a pore diameter distribution (i.e., the proportion of pores having a pore diameter within±15 Å based on the average pore diameter) of 70% or higher, preferably 80% or higher.

In the method for hydrotreating gas oil in the present invention in which the catalyst described is used, a gas oil fraction containing aromatic compounds is brought into contact with the catalyst described above under the conditions of a hydrogen partial pressure of from 3 to 8 MPa, a temperature of from 150 to 370° C., preferably from 200 to 370° C., a liquid hourly space velocity of from 0.3 to 5.0 $h^{-1}$, and a hydrogen/oil ratio of from 100 to 1,000 L/L, whereby nuclear hydrogenation of the aromatic compounds is carried out to attain a reduced aromatic content and the content of sulfur-containing compounds including those unsusceptible to desulfurization is reduced.

Typical properties of this gas oil fraction containing aromatic compounds are the same as the aforementioned examples of properties of feedstock oil to which the catalyst of the present invention is applicable.

The method for hydrotreating gas oil in the present invention may be practiced on a commercial scale by forming a layer of the catalyst of the present invention as a fixed bed, moving bed, or fluidized bed in a reaction vessel, introducing feedstock oil into this reaction vessel, and carrying out a hydrogenation reaction under the conditions shown above.

The most general is: a technique which comprises forming a catalyst layer of the fixed bed type in a reaction vessel, introducing feedstock oil into an upper part of the reaction vessel, passing it through the fixed bed from the upper side thereof, and discharging the product oil through a lower part of the reaction vessel; or a technique which comprises introducing feedstock oil into a lower part of the reaction vessel in contrast to the above technique, passing it through the fixed bed from the lower side thereof, and discharging the product oil through an upper part of the reaction vessel.

The catalyst of the present invention can be used in either of the case where the catalyst is packed into a single reaction vessel to carry out single-stage hydrotreatment and the case where the catalyst is packed into several reaction vessels to carry out multistage continuous hydrotreatment.

Especially when the feedstock oil is relatively heavy, it is preferred to carry out multistage hydrotreatment.

The method of hydrotreatment in the present invention comprises:

carrying out, as a first desulfurization step (hereinafter referred to as the "first step"), a catalytic reaction of straight-run gas oil having a boiling point of from 160 to 400° C. or blend oil comprising the straight-run gas oil and at least one other hydrocarbon oil at a hydrogen partial pressure of from 3 to 7 MPa, a temperature of from 200 to 400° C., a liquid hourly space velocity of from 0.5 to 5.0 h$^{-1}$, and a hydrogen/oil ratio of from 100 to 1,000 L/L in the presence of a catalyst comprising from 10 to 25% by weight at least one metal selected from the Group 6a of the periodic table and from 0.1 to 6% by weight at least one metal selected from the Group 8 of the periodic table in terms of the respective oxides based on the catalyst in a support comprising an inorganic oxide to thereby regulate the oil so as to have a sulfur-containing compound content of 0.2% by weight or lower after the step; and then carrying out, as a second desulfurization step (hereinafter referred to as the "second step"), a catalytic reaction of the oil after the first step at a hydrogen partial pressure of from 3 to 8 MPa, a temperature of from 150 to 370° C., and a liquid hourly space velocity of from 0.3 to 5.0 h$^{-1}$ in the presence of a catalyst comprising from 0.1 to 10% by weight platinum, from 0.1 to 20% by weight palladium, and from 0.05 to 1.2% by weight halogen in terms of the respective elements based on the catalyst in a support comprising an inorganic oxide containing an alumina.

The feedstock oil in the present invention is straight-run gas oil or blend oil comprising the gas oil and at least one other hydrocarbon oil, and has a boiling point of from 160 to 400° C.

Examples of other hydrocarbon oil include light cycle oil, thermally cracked gas oil, hydrotreated gas oil, desulfurized gas oil, and the like.

Use of feedstock oil having boiling points not higher than 400° C. is advantageous in that the amount of sulfur-containing compounds unsusceptible to desulfurization and heavier than 4,6-DMDBT is prevented from increasing considerably and the first and second steps can be carried out at moderate temperatures to yield a product oil having a satisfactory color. Furthermore, use of feedstock oil having boiling points not lower than 160° C. enables production of product oil having a high cetane number.

The main purpose of the first step (deep desulfurization step) in the present invention is to remove sulfur from the feedstock oil. In this step, a hydrodesulfurization treatment is carried out with a desulfurization catalyst.

The reaction conditions for the first step include a hydrogen partial pressure of from 3 to 7 MPa, preferably from 4 to 7 MPa, a temperature of from 200 to 400° C., preferably from 250 to 380° C., a liquid hourly space velocity of from 0.5 to 5.0 h$^{-1}$, preferably from 1.0 to 3.0 h$^{-1}$, and a hydrogen/oil ratio of from 100 to 1,000 L/L, preferably from 200 to 300 L/L.

By regulating the hydrogen partial pressure to 3 MPa or higher, the desulfurization activity of the catalyst is improved and product oil having a satisfactory color is obtained. By regulating the hydrogen partial pressure to 7 MPa or lower, desulfurization can be carried out without the necessity of heightening the pressure resistance of the equipment.

By using a reaction temperature of 200° C. or higher, the catalyst can have improved desulfurization activity. By using a reaction temperature of 400° C. or lower, the desulfurization activity is prevented from reaching saturation and the color of the product oil is improved.

By regulating the liquid hourly space velocity to 5.0 h$^{-1}$ or lower, the desulfurization reaction is sufficiently carried out due to the appropriate time period of contact between the catalyst and the feedstock oil, resulting in a reduced residual sulfur content in the product oil. By regulating the liquid hourly space velocity to 0.5 h$^{-1}$ or higher, a sufficient contact period is obtained and the efficiency of treatment is improved.

By regulating the hydrogen/oil ratio to 100 L/L or higher, the desulfurization reaction proceeds sufficiently. By regulating the hydrogen/oil ratio to 1,000 L/L or lower, the cost of treatment can be reduced because there is no need of excessively consuming hydrogen.

Various inorganic oxides can be used as the inorganic oxide constituting the support of the catalyst for use in the first step. Examples thereof include silica, alumina, boria, magnesia, titania, silica-alumina, silica-magnesia, silica-zirconia, silica-thoria, silica-beryllia, silica-titania, silica-boria, alumina-zirconia, alumina-titania, alumina-boria, alumina-chromia, titania-zirconia, silica-alumina-thoria, silica-alumina-zirconia, silica-alumina-magnesia, silica-magnesia-zirconia, and the like. These may be used alone or as a mixture of two or more thereof.

Preferred of those inorganic oxides are alumina, silica-alumina, alumina-titania, alumina-botia, and alumina-zirconia. Especially preferred is γ-alumina.

Examples of the at least one member selected from the Group 6a metals, which is one of the active ingredients deposited on the support described above, include molybdenum, tungsten, etc. The deposition amount thereof is from 10 to 25% by weight in terms of oxide based on the catalyst.

By regulating the amount of the Group 6a metal to 10% by weight or larger, the catalyst can have a sufficient absolute amount of the Group 6a metal serving as active sites and have improved desulfurization activity. By regulating the amount thereof to 25% by weight or smaller, metal aggregation is prevented to increase the number of active sites and thereby improve the desulfurization activity.

Examples of the at least one member selected from the Group 8 metals, which is the other active ingredient, include cobalt, nickel, etc. The deposition amount thereof is from 0.1 to 6% by weight in terms of oxide based on the catalyst.

By regulating the amount of the Group 8 metal to 0.1% by weight or larger, sufficient desulfurization activity is obtained. By regulating the amount thereof to 6% by weight or smaller, the desulfurization activity is prevented from reaching saturation.

Incidentally, phosphorus, boron, zinc, zirconium, and the like can be incorporated, according to need, besides the Group 6a metal and Group 8 metal described above.

If the desulfurization catalyst described above has too small an average pore diameter, the desired desulfurization activity cannot be obtained. If it has too large an average pore diameter, the catalyst has a reduced effective surface area although sulfur-containing compounds satisfactorily diffuse into the pores, resulting in reduced desulfurization activity. Consequently, the average pore diameter is preferably regulated to about from 60 to 90 Å.

It is important in the present invention that the product oil obtained through the first step described above should have a sulfur-containing compound content of 0.2% by weight or lower.

By regulating the sulfur-containing compound content in the oil to 0.2% by weight or lower, not only the hydrodesulfurization reaction in the second step (ultra-deep desulfurization step) which will be described later proceeds sufficiently but also the catalyst used in the second step has sufficient hydrogenation activity and a sufficient catalyst life stability.

There is no particular lower limit on the content of sulfur-containing compounds. However, the lower limit may be on a level which can be easily attained without fail when straight-run gas oil presently supplied generally or blend oil comprising the gas oil and at least one other hydrocarbon oil is treated in the first step under the conditions described above. Examples thereof include about 0.045% by weight.

In the present invention, a degassing step is preferably carried out after the first step described above in order to remove the hydrogen sulfide gas, ammonia gas, and the like yielded in that step.

This degassing step may be accomplished by using an oil-gas separating apparatus in general use, such as a gas separator and/or gas stripper.

After the first step described above or after the degassing step described above, the second step (ultra-deep desulfurization step) is carried out using the catalyst disclosed in Unexamined Published Japanese Patent Applications Nos. 10-235198 and 11-189776 under the conditions disclosed therein. Namely, the catalyst for use in the second step has the same properties as the catalyst of the present invention described above, except that the crystallite diameter thereof is not particularly limited. However, like the catalyst of the present invention, this catalyst preferably has a crystallite diameter of from 20 to 40 Å. The other requirements of the catalyst for use in the second step in this description are the same as those of the above-described catalyst of the present invention having a crystallite diameter of from 20 to 40 Å, unless otherwise indicated.

When the alumina serving as the main component of the support comprises a crystalline alumina having a crystallite diameter within that range, this support produces the following effect besides the effects described above. Namely, during catalyst regeneration, the crystal structure is not destroyed in the regeneration step and the catalyst can be regenerated to such a degree as to have the same performance as fresh catalysts.

Consequently, in the present invention, the use of an alumina comprising a crystalline alumina having the crystallite diameter shown above produces effects that a catalyst pore distribution capable of maximizing the desulfurization activity can be formed and that the catalyst can be repeatedly regenerated so as to have the maximum desulfurization activity.

The catalyst for use in the second step may contain the same minor support components as those described above. However, the content of the minor support components in the support is from 1 to 60% by weight, preferably from 1 to 20% by weight, in terms of oxides based on the support.

The catalyst to be used in the second step may be a regenerated one.

This regeneration is accomplished by carrying out a reaction for coke deposit removal at an air partial pressure of from 0.05 to 5 MPa and a temperature of from 200 to 800° C.

Specifically, a spent catalyst is treated at the air partial pressure and temperature shown above, whereby the coke deposited on the catalyst is calcined off and the catalyst can be regenerated to such a degree as to have the same performance as fresh catalysts.

The regenerated catalyst which has undergone the coke deposit-removing reaction described above is preferably further subjected to a treatment for highly dispersed active metals in which the regenerated catalyst is treated at a temperature of from 200 to 800° C. in the presence of a chlorine compound.

Usable as this chlorine compound are inorganic chlorides such as hydrochloric acid and organic chlorides such as ethylene dichloride, methyl chloride, methylene chloride, and trichloroethylene. Preferred is ethylene dichloride.

Such a chlorine compound is mixed with kerosene, gas oil, or the like and the mixture is introduced into a layer of the regenerated catalyst which has undergone the coke deposit-removing reaction. The regenerated catalyst layer is then treated at 200 to 800° C. Thus, the active metals present in the regenerated catalyst which has undergone the coke deposit-removing reaction can be brought into the same highly dispersed state as in fresh catalysts.

It is possible to simultaneously carry out the coke deposit-removing reaction and the treatment for highly dispersed active metals described above.

Namely, when a spent catalyst is treated at an air partial pressure of from 0.05 to 5 MPa and a temperature of from 200 to 800° C. in the presence of the chlorine compound, then the coke deposited on the spent catalyst is calcined off and, simultaneously therewith, the active metals present in the catalyst can be brought into a highly dispersed state.

According to the method of treatment for gas oil quality improvement of the present invention, which comprises the steps described above, feedstock oil is subjected to deep desulfurization under specific conditions, subsequently degassed according to need (to remove hydrogen sulfide, ammonium, etc.), and then subjected to ultra-deep desulfurization under specific conditions to thereby yield higher-quality gas oil fraction having a high cetane number, a satisfactory color, and a residual sulfur content as low as 10 ppm.

This series of steps is carried out under relatively mild reaction conditions using, for example, an ordinary reactor comprising a high-pressure flow-through type reaction vessel having a moving-bed or fluidized-bed catalyst layer formed therein and an ordinary gas separator.

The present invention will be described in more detail and explained concretely by means of Examples, but the scope of the present invention should not be construed as being limited by the Examples.

Procedures for instrumental analyses of properties, etc. are summarized below prior to the Examples.

Procedure for Measurement of Crystallite Diameter of Crystalline Alumina:

Measurement was made by X-ray diffractometry. XRD (RINT), manufactured by Rigaku Corp., was used for the measurement under the following conditions. The results of the measurement were analyzed according to the following procedure.

Conditions for Measurement:
  Bulb: Cu
  Tube voltage: 50 kV
  Tube current: 150 mA
  Goniometer: RINT2000 vertical goniometer
  Divergent slit: 1 deg.
  Scattering slit: 1 deg.
  Light-receiving slit: 0.15 mm
  Scanning mode: 0.25°/min
  Scanning step: 0.02°
  Rotational speed: 20.00 rpm
  Scanning range: 5–90°

Analysis of Measurement Results:

The crystallite diameter of a crystalline alumina was calculated from the half-value width of the peak at $2\theta=670$ using the Scherrer equation described above. As a reference material was used a silicon powder.

Procedure for Measurement by Ammonia-TPD Method:

An ammonia-TPD apparatus manufactured by Bell Japan Corp. was used. A 0.1 g portion of a sample was packed into an adsorption tube and a pretreatment was carried out in which the sample was heated to 500° C. over 50 minutes in a helium stream, held at 500° C. for 1 hour in the stream, and then cooled to room temperature over 11 minutes and 30 seconds. This sample was allowed to adsorb ammonia at room temperature and ordinary pressure for 15 minutes and then subjected to a degassing treatment in a helium stream at a reduced pressure of 150 Torr and 100° C. for 12 minutes and 30 seconds. The sample degassed was examined for ammonia desorption spectrum at a heating rate of 10° C./min in a helium stream to determine the total amount of ammonia desorbed. This amount was taken as the acid amount.

Procedure for Determination of Degree of Dispersion of Active Metals by CO Pulse Method:

A CO adsorption analyzer (R-6015) manufactured by Okura Riken was used. Pretreatment of a catalyst, CO adsorption by the pulse method, measurement of the amount of CO adsorbed, and analysis of measurement results were carried out according to the following procedure.

Pretreatment of Catalyst (Hydrogen Reduction Treatment):

A catalyst was dried in an air atmosphere at 120° C. for 2 hours, and 100 mg of this catalyst was placed in a cell for pulse-method CO adsorption analysis. The sample was heated to 350° C. over 60 minutes in a hydrogen stream (30 $cm^3$/min), held at this temperature for 120 minutes, and then cooled to 50° C. over 60 minutes in the stream.

Measurement of Amount of CO Adsorbed:

At 50° C., CO was adsorbed onto the catalyst by the pulse method. The amount of the CO adsorbed was measured with a thermal conductivity detector.

Analysis of Measurement Results:

The results were analyzed by a method proposed by the Committee of Reference Catalyst of the Catalyst Society.

Specifically, the difference between the average for three CO pulses after a stationary state and the pulse area in each measurement was taken as the amount of CO adsorbed, and the stoichiometry between the CO and the active metals was assumed (CO/active metal=1) to determine the metal dispersion degree [(amount of exposed metals)/(amount of metals introduced)].

Procedure for EXAFS Analysis:

Pretreatment of a catalyst, EXAFS analysis, and analysis of measurement results were carried out according to the following procedure.

Pretreatment of Catalyst:

A powdered catalyst was placed in an in-situ cell. The catalyst was dried at 120° C. in an air stream for 30 minutes, and the atmosphere in the cell was replaced with nitrogen gas. Thereafter, $H_2$ was introduced (flow rate, about 50 ml/min) in place of nitrogen, and the catalyst was heated to 350° C. at a rate of 2 ° C./min, subsequently held for 2 hours, and then cooled to ordinary temperature in that atmosphere. The cell was evacuated to $10^{-3}$ Torr with an oil diffusion pump.

EXAFS Analysis:

using the hard X-ray beam line in the radiation light experimental facilities of Material Structure Science Laboratory of High-Energy Accelerator Institution, the Pt LIII absorption edge and the Pd K absorption edge were examined at room temperature with a transmission XAFS apparatus (BL-10B).

Analysis of Measurement Results:

The interatomic distance of each bond and the average coordination number of atoms (coordination number) were calculated by carrying out the inverse Fourier transform of the EXAFS spectrum and curve fitting using empirical parameters and theoretical parameters.

The (empirical) parameters (backscatter amplitude and phase factor) for Pt—Pt, Pd—O, Pd—Cl, and Pd—Pd were calculated from the EXAFS spectra of a Pt foil, PdO, $PdCl_2$, and a Pd foil each having a known structure through the inverse Fourier transform and curve fitting.

With respect to Pt—Pd and Pd—Pt, (theoretical) parameters were calculated using a program (FEFF Ver6.0).

For each sample, the ranges in which the Fourier transform and inverse Fourier transform were applied were standardized to 3.1–11.3 $Å^{-1}$ (k3) (Δk=8.2) and 4–11 $Å^{-1}$ (k3) (Δk=7).

EXAMPLE 1

A silica-alumina (37.60 g) having a pore volume of 0.71 ml/g and a specific surface area of 363 $m^2$/g (silica/alumina weight ratio=20/80; columnar molding having a diameter of ¹⁄₁₆ inch; acid amount, 0.66 mmol/g) was impregnated with a solution prepared by dissolving 0.50 g of chloroplatinic acid hexahydrate and 0.63 g of palladium chloride in 31.26 g of 10% aqueous hydrochloric acid solution. The silica-alumina impregnated was held at about 25° C. for 2 hours, subsequently air-dried, and placed in a muffle furnace, in which the silica-alumina was first dried at 120° C. for about 1 hour and then calcined at 500° C. for 4 hours. Thus, Catalyst A was obtained.

Catalyst A contained Pt (0.51 wt %)-Pd (0.97 wt %)-Cl (0.57 wt %)/$SiO_2$—$Al_2O_3$ (97.95 wt %), with (Pd)/(Pd+Pt) being 0.66, and had a specific surface area of 282 $m^2$/g, a pore volume of 0.73 ml/g, an average pore diameter of 67 Å, a pore distribution of 74% (average pore diameter±20 Å), an acid amount of 0.47 mmol/g, a γ-alumina crystallite diameter of 33 Å, a metal dispersion degree of 60%, a Pt—Pt coordination number of 4.2, and a Pd—Pd coordination number of 1.4.

EXAMPLE 2

A silica-alumina (37.60 g) having a pore volume of 0.73 ml/g and a specific surface area of 380 $m^2$/g (silica/alumina weight ratio=10/90; columnar molding having a diameter of ¹⁄₁₆ inch; acid amount, 0.66 mmol/g) was impregnated with a solution prepared by dissolving 0.50 g of chloroplatinic acid hexahydrate and 0.63 g of palladium chloride in 51.95 g of 10% aqueous hydrochloric acid solution. This silica-alumina was held, air-dried, dried, and calcined under the same conditions as in Example 1. Thus, Catalyst B was obtained.

Catalyst B contained Pt (0.50 wt %)-Pd (0.99 wt %)-Cl (0.48 wt %)/$SiO_2$—$Al_2O_3$ (98.03 wt %), with (Pd)/(Pd+Pt) being 0.66, and had a specific surface area of 325 $m^2$/g, a pore volume of 0.75 ml/g, an average pore diameter of 69 Å, a pore distribution of 75% (average pore diameter±20 Å), an acid amount of 0.48 mmol/g, a γ-alumina crystallite diameter of 35 Å, and a metal dispersion degree of 54%.

EXAMPLE 3

A silica-alumina (37.60 g) having a pore volume of 0.69 ml/g and a specific surface area of 338 $m^2$/g (silica/alumina weight ratio=40/60; columnar molding having a diameter of ¹⁄₁₆ inch; acid amount, 0.66 mmol/g) was impregnated with a solution prepared by dissolving 0.50 g of chloroplatinic acid hexahydrate and 0.63 g of palladium chloride in 51.95 g of 10% aqueous hydrochloric acid solution. This silica-alumina was held, air-dried, dried, and calcined under the same conditions as in Example 1. Thus, Catalyst C was obtained.

Catalyst C contained Pt (0.48 wt %)-Pd (0.99 wt %)-Cl (0.48 wt %)/$SiO_2$—$Al_2O_3$ (98.05 wt %), with (Pd)/(Pd+Pt)

being 0.66, and had a specific surface area of 279 m²/g, a pore volume of 0.57 ml/g, an average pore diameter of 77 Å, a pore distribution of 75% (average pore diameter±20 Å), an acid amount of 0.48 mmol/g, a γ-alumina crystallite diameter of 31 Å, a metal dispersion degree of 58%, a Pt—Pt coordination number of 4.3, and a Pd—Pd coordination number of 1.3.

EXAMPLE 4

A boria-alumina (37.60 g) having a pore volume of 0.74 ml/g and a specific surface area of 374 m²/g (boria/alumina weight ratio=10/90; columnar molding having a diameter of ¹⁄₁₆ inch; acid amount, 0.66 mmol/g) was impregnated with a solution prepared by dissolving 0.50 g of chloroplatinic acid hexahydrate and 0.63 g of palladium chloride in 51.95 g of 10% aqueous hydrochloric acid solution. This boria-alumina was held, air-dried, dried, and calcined under the same conditions as in Example 1. Thus, Catalyst D was obtained.

Catalyst D contained Pt (0.49 wt %)-Pd (0.97 wt %)-Cl (0.49 wt %)/$B_2O_3$—$Al_2O_3$ (98.05 wt %), with (Pd)/(Pd+Pt) being 0.66, and had a specific surface area of 325 m²/g, a pore volume of 0.48 ml/g, an average pore diameter of 70 Å, a pore distribution of 75% (average pore diameter±20 Å), an acid amount of 0.52 mmol/g, a γ-alumina crystallite diameter of 29 Å, a metal dispersion degree of 53%, a Pt—Pt coordination number of 4.1, and a Pd—Pd coordination number of 1.8.

EXAMPLE 5

A silica-alumina (37.29 g) having a pore volume of 0.73 ml/g and a specific surface area of 380 m²/g (silica/alumina weight ratio=20/80; columnar molding having a diameter of ¹⁄₁₆ inch; acid amount, 0.66 mmol/g) was impregnated with a solution prepared by dissolving 0.50 g of chloroplatinic acid hexahydrate and 0.31 g of palladium chloride in 30.95 g of 10% aqueous hydrochloric acid solution. This silica-alumina was held, air-dried, dried, and calcined under the same conditions as in Example 1. Thus, Catalyst E was obtained.

Catalyst E contained Pt (0.48 wt %)-Pd (0.51 wt %)-Cl (0.46 wt %)/$SiO_2$—$Al_2O_3$ (98.55 wt %), with (Pd)/(Pd+Pt) being 0.52, and had a specific surface area of 287 m²/g, a pore volume of 0.72 ml/g, an average pore diameter of 66 Å, a pore distribution of 75% (average pore diameter±20 Å) an acid amount of 0.52 mmol/g, a γ-alumina crystallite diameter of 33 Å, and a metal dispersion degree of 62%.

EXAMPLE 6

A silica-alumina (36.73 g) having a pore volume of 0.73 m/lg and a specific surface area of 380 m²/g (silica/alumina weight ratio=20/80; columnar molding having a diameter of ¹⁄₁₆ inch; acid amount, 0.66 mmol/g) was impregnated with a solution prepared by dissolving 0.50 g of chloroplatinic acid hexahydrate and 1.26 g of palladium chloride in 30.49 g of 10% aqueous hydrochloric acid solution. This silica-alumina was held, air-dried, dried, and calcined under the same conditions as in Example 1. Thus, Catalyst F was obtained.

Catalyst F contained Pt (0.52 wt %)-Pd (1.98 wt %)-Cl (0.48 wt %)/$SiO_2$—$Al_2O_3$ (97.02 wt %), with (Pd)/(Pd+Pt) being 0.79, and had a specific surface area of 287 m²/g, a pore volume of 0.72 ml/g, an average pore diameter of 66 Å, a pore distribution of 75% (average pore diameter±20 Å), an acid amount of 0.45 mmol/g, a γ-alumina crystallite diameter of 33 Å, and a metal dispersion degree of 53%.

EXAMPLE 7

A titania-zirconia-alumina (37.60 g) having a pore volume of 0.72 ml/g and a specific surface area of 286 m²/g (titania/zirconia/alumina weight ratio=10/10/80; columnar molding having a diameter of ¹⁄₁₆ inch; acid amount, 0.59 mmol/g) was impregnated with a solution prepared by dissolving 0.50 g of chloroplatinic acid hexahydrate and 0.63 g of palladium chloride in 31.26 g of 10% aqueous hydrochloric acid solution. This titania-zirconia-alumina was held, air-dried, dried, and calcined under the same conditions as in Example 1. Thus, Catalyst G was obtained.

Catalyst G contained Pt (0.49 wt %)-Pd (1.00 wt %)-Cl (0.48 wt %)/$TiO_2$—$ZrO_2$—$Al_2O_3$ (98.03 wt %), with (Pd)/(Pd+Pt) being 0.67, and had a specific surface area of 267 m²/g, a pore volume of 0.68 ml/g, an average pore diameter of 75 Å, a pore distribution of 75% (average pore diameter±20 Å), an acid amount of 0.43 mmol/g, a γ-alumina crystallite diameter of 33 Å, and a metal dispersion degree of 51%.

COMPARATIVE EXAMPLE 1

An alumina (37.60 g) having a pore volume of 0.73 ml/g and a specific surface area of 380 m²/g (columnar molding having a diameter of ¹⁄₁₆ inch; acid amount, 0.66 mmol/g) was impregnated with a solution prepared by dissolving 0.50 g of chloroplatinic acid hexahydrate and 0.63 g of palladium chloride in 51.95 g of 10% aqueous hydrochloric acid solution. This alumina was held, air-dried, dried, and calcined under the same conditions as in Example 1. Thus, Catalyst a was obtained.

Catalyst a contained Pt (0.50 wt %)-Pd (1.00 wt %)-Cl (0.43 wt %)/$Al_2O_3$ (98.07 wt %), with (Pd)/(Pd+Pt) being 0.67, and had a specific surface area of 320 m²/g, a pore volume of 0.65 ml/g, an average pore diameter of 70 Å, a pore distribution of 75% (average pore diameter±20 Å), an acid amount of 0.41 mmol/g, a γ-alumina crystallite diameter of 41 Å, and a metal dispersion degree of 50%.

COMPARATIVE EXAMPLE 2

A silica-alumina (37.60 g) having a pore volume of 0.71 ml/g and a specific surface area of 363 m²/g (silica/alumina weight ratio=20/80; columnar molding having a diameter of ¹⁄₁₆ inch; acid amount, 0.66 mmol/g) was impregnated with a solution prepared by dissolving 0.34 g of tetraammineplatinum(II) chloride hydrate and 0.95 g of tetraamminepalladium(II) chloride hydrate in 31.26 g of ion-exchanged water. This silica-alumina was held, air-dried, dried, and calcined under the same conditions as in Example 1. Thus, Catalyst b was obtained.

Catalyst b contained Pt (0.49 wt %)-Pd (1.01 wt %)-Cl (0.41 wt %)/$SiO_2Al_2O_3$ (98.09 wt %), with (Pd)/(Pd+Pt) being 0.67, and had a specific surface area of 290 m²/g, a pore volume of 0.66 ml/g, an average pore diameter of 66 Å, a pore distribution of 73% (average pore diameter±20 Å), an acid amount of 0.46 mmol/g, a γ-alumina crystallite diameter of 33 Å, and a metal dispersion degree of 15%.

COMPARATIVE EXAMPLE 3

A silica-alumina (37.60 g) having a pore volume of 1.18 ml/g and a specific surface area of 578 m²/g (silica/alumina weight ratio=20/80; columnar molding having a diameter of ¹⁄₁₆ inch; acid amount, 1.12 mmol/g) was impregnated with a solution prepared by dissolving 0.50 g of chloroplatinic acid hexahydrate and 0.63 g of palladium chloride in 51.95 g of 10% aqueous hydrochloric acid solution. This silica-alumina was held, air-dried, dried, and calcined under the same conditions as in Example 1. Thus, Catalyst c was obtained.

Catalyst c contained Pt (0.49 wt %)-Pd (0.98 wt %)-Cl (0.46 wt %)/SiO$_2$—Al$_2$O$_3$ (98.07 wt %), with (Pd)/(Pd+Pt) being 0.67, and had a specific surface area of 462 m$^2$/g, a pore volume of 0.70 ml/g, an average pore diameter of 54 Å, a pore distribution of 75% (average pore diameter±20 Å), an acid amount of 0.82 mmol/g, a γ-alumina crystallite diameter of 0 Å, and a metal dispersion degree of 60%.

COMPARATIVE EXAMPLE 4

An H-form zeolite USY (37.29 g) having a pore volume of 0.54 ml/g and a specific surface area of 582 m$^2$/g (silica/alumina molar ratio in the zeolite=36; unit cell size= 24.18 Å; acid amount, 0.08 mmol/g) was impregnated with a solution prepared by dissolving 0.50 g of chloroplatinic acid hexahydrate and 0.31 g of palladium chloride in 22.10 g of 10% aqueous hydrochloric acid solution. This zeolite was held, air-dried, dried, and calcined under the same conditions as in Example 1. Thus, Catalyst d was obtained.

Catalyst d contained Pt (0.51 wt %)-Pd (0.50 wt %)-Cl (0.34 wt %)/zeolite (98.65 wt %), with (Pd)/(Pd+Pt) being 0.50, and had a specific surface area of 484 m$^2$/g, a pore volume of 0.49 ml/g, an acid amount of 0.06 mmol/g, and a metal dispersion degree of 57%.

COMPARATIVE EXAMPLE 5

A silica-alumina (37.29 g) having a pore volume of 0.97 ml/g and a specific surface area of 342 m$^2$/g (silica/alumina weight ratio=88/12; columnar molding having a diameter of 1/16 inch; acid amount, 0.09 mmol/g) was impregnated with a solution prepared by dissolving 0.50 g of chroroplatinic acid hexahydrate and 0.31 g of palladium chloride in 36.17 g of 10% aqueous hydrochloric acid solution. This silica-alumina was held, air-dried, dried, and calcined under the same conditions as in Example 1. Thus, Catalyst e was obtained.

Catalyst e contained Pt (0.50 wt %)-Pd (0.49 wt %)-Cl (0.34 wt %)/SiO$_2$Al$_2$O$_3$ (98.67 wt %), with (Pd)/(Pd+Pt) being 0.49, and had a specific surface area of 484 m$^2$/g, a pore volume of 0.49 ml/g, an acid amount of 0.06 mmol/g, a γ-alumina crystallite diameter of 0 Å, and a metal dispersion degree of 51%.

COMPARATIVE EXAMPLE 6

A silica-alumina (48.25 g) having a pore volume of 0.73 3ml/g and a specific surface area of 380 m$^2$/g (silica/alumina weight ratio=20/80; columnar molding having a diameter of 1/16 inch; acid amount, 0.66 mmol/g) was impregnated with a solution prepared by dissolving 0.6437 g of chloroplatinic acid hexahydrate in 34.25 g of 10% aqueous hydrochloric acid solution. This silica-alumina was held, air-dried, dried, and calcined under the same conditions as in Example 1. Thus, Catalyst f was obtained.

Catalyst f contained Pt (0.52 wt %)-Cl (0.17 wt %)/SiO$_2$—Al$_2$O$_3$ (99.31 wt %), and had a specific surface area of 306 m$^2$/g, a pore volume of 0.72 ml/g, an average pore diameter of 65 Å, a pore distribution of 75% (average pore diameter +20 Å), an acid amount of 0.53 mmol/g, a γ-alumina crystallite diameter of 33 Å, and a metal dispersion degree of 60%.

COMPARATIVE EXAMPLE 7

A silica-alumina (47.63 g) having a pore volume of 0.73 ml/g and a specific surface area of 380 m$^2$/g (silica/alumina weight ratio=20/80; columnar molding having a diameter of 1/16 inch; acid amount, 0.66 mmol/g) was impregnated with a solution prepared by dissolving 0.6371 g of chloroplatinic acid hexahydrate and 0.22 g of palladium chloride in 39.53 g of 10% aqueous hydrochloric acid solution. This silica-alumina was held, air-dried, dried, and calcined under the same conditions as in Example 1. Thus, Catalyst g was obtained.

Catalyst g contained Pt (0.57 wt %)-Pd (0.27 wt %)-Cl (0.12 wt %)/SiO$_2$—Al$_2$O$_3$(99.04 wt %), with (Pd)/(Pd+Pt) being 0.32, and had a specific surface area of 287 m$^2$/g, a pore volume of 0.71 ml/g, an average pore diameter of 66 Å, a pore distribution of 75% (average pore diameter±20 Å), an acid amount of 0.50 mmol/g, a γ-alumina crystallite diameter of 33 Å, and a metal dispersion degree of 62%.

Hydrodesulfurization Reaction of Desulfurized Straight-Run Gas Oils:

Using the catalysts prepared in the Examples and Comparative Examples given above, desulfurized straight-run gas oil having the properties shown below were hydrotreated according to the following procedure.

First, the catalyst was packed into the reaction vessel of a high-pressure flow-through type reactor to form a fixed-bed catalyst layer. A pretreatment was performed under the following pretreatment conditions.

Subsequently, a fluid comprising a mixture of feedstock oil and hydrogen-containing gas and heated to a reaction temperature was introduced through an upper part of the reaction vessel to allow a hydrodesulfurization reaction to proceed under the following conditions. A fluid comprising a mixture of the product oil yielded and gases was discharged through a lower part of the reaction vessel, and the product oil was separated with a gas/liquid separator.

Catalyst Pretreatment Condition s:
  Pressure (hydrogen partial pressure): 4.9 MPa
  Atmosphere: in hydrogen gas stream
  Temperature:
    stepwise heating comprising 1.5-h holding at 150° C. and subsequent 2-h holding at 350° C.

Hydrodesulfurization Reaction Conditions:
  Reaction temperatures: 300, 320, 340° C.
  Pressure (hydrogen partial pressure): 4.9 MPa
  Liquid hourly space velocity: 1.5 h$^{-1}$
  Hydrogen/oil ratio: 560 L/L Feedstock Oil (1):
  Kind of oil: desulfurized straight-run gas oil
  Specific gravity (15/4° C.): 0.8392
  Pour point (° C.): 0.0
  Cloud point (° C.): 2.0
  Dynamic viscosity (30° C.): 5.333 (cSt)
  Distillation characteristics:
    Initial boiling point: 216.5° C.
    50% point: 296.0° C.
    90% point: 350.5° C.
    End point: 374.5° C.
  Sulfur content: 395 wt ppm
  Nitrogen content: 71 vol ppm
  Saturated hydrocarbon components: 74.3 vol %
  Total aromatic components: 25.7 vol %
  Monocyclic aromatic components: 23.7 vol %
  Dicyclic aromatic components: 1.7 vol %
  Tricyclic aromatic components: 0.3 vol %
  Saybolt color: +2.0

Cetane index: 60.5
Feedstock Oil (2):
  Kind of oil: desulfurized straight-run gas oil
  Specific gravity (15/4° C.): 0.8392
    Pour point (° C.): −2.5
    Cloud point (° C.): 2.0
  Dynamic viscosity (30° C.): 5.209 (cSt)
  Distillation characteristics:
    Initial boiling point: 212.5° C.
    50% point: 295.5° C.
    90% point: 349.5° C.
    End point: 368.5° C.
  Sulfur content: 100 wt ppm
  Nitrogen content: 16 vol ppm
  Saturated hydrocarbon components: 76.5 vol %
  Total aromatic components: 23.5 vol %
  Monocyclic aromatic components: 21.3 vol %
  Dicyclic aromatic components: 2.0 vol %
  Tricyclic aromatic components: 0.2 vol %
  Saybolt color: −5.0
  Cetane index: 59.9

The results of the reactions were analyzed by the following method.

The reactor was operated at each of reaction temperatures of 300, 320, and 340° C. At the time when 6 days had passed, each product oil was sampled. These samples were analyzed for properties to determine the degree of desulfurization, desulfurization reaction rate constant, degree of dearomatization, dearomatization reaction rate constant, etc. in the following manners.

The results obtained are as shown in Tables 1 to 3.

(1) Degree of Desulfurization (HDS) (%):

The proportion of sulfur-containing compounds which have disappeared from the feedstock oil through conversion to hydrogen sulfide by desulfurization reaction is defined as the degree of desulfurization. The degree of desulfurization was calculated from the analytical values of sulfur content for the feedstock oil and product oil using the following equation.

(2) Desulfurization Reaction Rate Constant (Ks):

The rate constant of a rate equation which gives the first order of reaction with respect to the decrease in the sulfur content in the product oil (Sp) is taken as the desulfurization reaction rate constant (Ks).

Incidentally, the higher the reaction rate constant, the better the catalytic activity.

$$\text{Degree of desulfurization }(\%)=((100-Sp)/Sf)\times 100$$

$$\text{Desulfurization reaction rate constant}=\ln(Sf/Sp)\times(LHSV)$$

wherein Sf: sulfur content in feedstock oil (wt %)
  Sp: sulfur content in product oil (wt %)
  LHSV: liquid hourly space velocity (h$^{-1}$)

$$\text{Specific activity }(\%)=[(\text{each desulfurization reaction rate constant})/(\text{desulfurization reaction rate constant of comparative Catalyst a})]\times 100$$

(3) Degree of Dearomatization (HDA) (%):

The degree of dearomatization was defined as the proportion of the decrease in aromatic content in the oil treated.

(4) Dearomatization Reaction Rate Constant (Ka):

The rate constant of a rate equation which gives the first order of reaction with respect to the decrease in the aromatic content in the product oil (Ap) is taken as the dearomatization reaction rate constant (Ka).

Incidentally, the higher the reaction rate constant, the better the catalytic activity.

$$\text{Degree of dearomatization }(\%)=((100-Ap)/Af)\times 100$$

$$\text{Desulfurization reaction rate constant}=\ln(Af/Ap)\times(LHSV)$$

wherein Af: aromatic content in feedstock oil (wt %)
  Ap: aromatic content in product oil (wt %)
  LHSV: liquid hourly space velocity (h$^{-1}$)

$$\text{Specific activity }(\%)=[(\text{each hydrogenation reaction rate constant})/(\text{hydrogenation reaction rate constant of comparative Catalyst a})]\times 100$$

TABLE 1

| | Example | | | | | | |
|---|---|---|---|---|---|---|---|
| Feedstock oil | (1) | (1) | (1) | (1) | (1) | (1) | (1) |
| Catalyst | A | B | C | D | E | F | G |
| Reaction temperature (° C.) | 300 | 300 | 300 | 300 | 300 | 300 | 300 |
| Sulfur content (wt ppm) | 42 | 104 | 47 | 84 | 126 | 34 | 65 |
| Degree of desulfurization (%) | 89.4 | 73.7 | 88.1 | 78.7 | 68.1 | 91.4 | 83.5 |
| Desulfurization rate constant | 3.40 | 2.01 | 3.19 | 2.34 | 1.72 | 3.69 | 2.72 |
| Specific activity | 262 | 155 | 245 | 180 | 132 | 284 | 209 |
| Aromatic content (vol %) | 6.7 | 10.6 | 7.3 | 9.8 | 12.3 | 5.9 | 8.4 |
| Dicyclic aromatic content (vol %) | 0.1 | 0.2 | 0.2 | 0.2 | 0.2 | 0.2 | 0.2 |
| Tricyclic aromatic content (vol %) | 0 | 0 | 0 | 0 | 0 | 0 | 0 |
| Degree of dearomatization (%) | 73.9 | 58.8 | 71.6 | 61.9 | 52.1 | 77.0 | 67.3 |
| Dearomatization rate constant | 2.02 | 1.32 | 1.89 | 1.44 | 1.10 | 2.22 | 1.67 |
| Specific activity | 265 | 174 | 249 | 189 | 145 | 292 | 220 |
| | Comparative Example | | | | | | |
| Feedstock oil | (1) | (1) | (1) | (1) | (1) | (1) | (1) |
| Catalyst | a | b | c | d | e | f | g |
| Reaction temperature (° C.) | 300 | 300 | 300 | 300 | 300 | 300 | 300 |
| Sulfur content (wt ppm) | 166 | 250 | 190 | 296 | 330 | 331 | 220 |
| Degree of desulfurization (%) | 58.0 | 36.7 | 51.9 | 25.1 | 16.5 | 16.5 | 44.3 |
| Desulfurization rate constant | 1.30 | 0.69 | 1.10 | 0.43 | 0.27 | 0.27 | 0.88 |

TABLE 1-continued

| | | | | | | | |
|---|---|---|---|---|---|---|---|
| Specific activity | 100 | 53 | 85 | 33 | 21 | 21 | 68 |
| Aromatic content (vol %) | 15.5 | 19.8 | 17.0 | 21.5 | 23.4 | 23.6 | 18.3 |
| Dicyclic aromatic content (vol %) | 0.5 | 0.9 | 0.6 | 1.8 | 1.7 | 1.8 | 0.6 |
| Tricyclic aromatic content (vol %) | 0 | 0.2 | 0 | 0.2 | 0.2 | 0.2 | 0 |
| Degree of dearomatization (%) | 39.7 | 23.0 | 33.9 | 16.3 | 8.9 | 8.2 | 28.8 |
| Dearomatization rate constant | 0.76 | 0.40 | 0.62 | 0.27 | 0.14 | 0.13 | 0.51 |
| Specific activity | 100 | 53 | 82 | 36 | 18 | 17 | 67 |

TABLE 2

| | Example | | Comparative Example |
|---|---|---|---|
| Feedstock oil | (1) | (1) | (1) |
| Catalyst | A | F | a |
| Reaction temperature (° C.) | 320 | 320 | 320 |
| Sulfur content (wt ppm) | 20 | 16 | 130 |
| Degree of desulfurization (%) | 94.9 | 95.9 | 67.1 |
| Desulfurization rate constant | 4.5 | 4.81 | 1.67 |
| Specific activity | 269 | 288 | 100 |
| Aromatic content (vol %) | 5.4 | 4.8 | 14.5 |
| Dicyclic aromatic content (vol %) | 0.2 | 0.2 | 0.5 |
| Tricyclic aromatic content (vol %) | 0 | 0 | 0 |
| Degree of dearomatization (%) | 79.0 | 81.3 | 43.6 |
| Dearomatization rate constant | 2.34 | 2.52 | 0.86 |
| Specific activity | 272 | 293 | 100 |

| | Example | | Comparative Example |
|---|---|---|---|
| Feedstock oil | (1) | (1) | (1) |
| Catalyst | A | F | a |
| Reaction temperature (° C.) | 340 | 340 | 340 |
| Sulfur content (wt ppm) | 2 | 2 | 62 |
| Degree of desulfurization (%) | 99.5 | 99.5 | 84.3 |
| Desulfurization rate constant | 7.93 | 7.93 | 2.78 |
| Specific activity | 285 | 285 | 100 |
| Aromatic content (vol %) | 3.9 | 3.6 | 12.4 |
| Dicyclic aromatic content (vol %) | 0.2 | 0.1 | 0.5 |
| Tricyclic aromatic content (vol %) | 0 | 0 | 0 |
| Degree of dearomatization (%) | 84.8 | 86.0 | 51.8 |
| Dearomatization rate constant | 2.83 | 2.95 | 1.09 |
| Specific activity | 259 | 271 | 100 |

TABLE 3

| | Example | | Comparative Example |
|---|---|---|---|
| Feedstock oil | (2) | (2) | (2) |
| Catalyst | A | F | d |
| Reaction temperature (° C.) | 300 | 300 | 300 |
| Sulfur content (wt ppm) | 2 | 1 | 72 |
| Degree of desulfurization (%) | 99.98 | 99.99 | 28.0 |
| Desulfurization rate constant | 5.87 | 6.91 | 0.49 |
| Specific activity | 1198 | 1410 | 100 |
| Aromatic content (vol %) | 0.8 | 0.6 | 15.2 |
| Dicyclic aromatic content (vol %) | 0 | 0 | 0.5 |
| Tricyclic aromatic content (vol %) | 0 | 0 | 0 |
| Degree of dearomatization (%) | 96.6 | 97.4 | 35.3 |
| Dearomatization rate constant | 5.07 | 5.50 | 0.67 |
| Specific activity | 757 | 821 | 100 |

| | Example | | Comparative Example |
|---|---|---|---|
| Feedstock oil | (2) | (2) | (2) |
| Catalyst | A | F | a |
| Reaction temperature (° C.) | 320 | 320 | 320 |

TABLE 3-continued

| Sulfur content (wt ppm) | 0 | 0 | 52 |
|---|---|---|---|
| Degree of desulfurization (%) | 100 | 100 | 48.0 |
| Desulfurization rate constant | >10.36 | >10.36 | 0.98 |
| Specific activity | >1000 | >1000 | 100 |
| Aromatic content (vol %) | 1.3 | 1.2 | 15.9 |
| Dicyclic aromatic content (vol %) | 0 | 0 | 0.5 |
| Tricyclic aromatic content (vol %) | 0 | 0 | 0 |
| Degree of dearomatization (%) | 94.5 | 94.9 | 32.3 |
| Dearomatization rate constant | 4.34 | 4.46 | 0.59 |
| Specific activity | 735 | 756 | 100 |

PRODUCTION EXAMPLE 1

Catalyst for First Step:

A silica-alumina support (50.00 g) having a pore volume of 0.70 ml/g, a specific surface area of 359 m$^2$/g, and an average pore diameter of 70 Å (silica/alumina weight ratio= 1/99) was impregnated with an aqueous solution prepared by dissolving 5.51 g of cobalt carbonate, 19.02 g of molybdophosphoric acid, and 1.95 g of orthophosphoric acid in 38.5 g of ion-exchanged water. This support was held at about 25° C. for about 2 hours, subsequently air-dried, and then calcined in a muffle furnace at 500° C. for 4 hours to obtain Catalyst i.

Catalyst i contained CoO (5 wt %)-MoO$_3$ (20 wt %)-P$_2$O$_5$ (3 wt %)/SiO$_2$—Al$_2$O$_3$ (72 wt %), and had a specific surface area of 253 m$^2$/g, a pore volume of 0.5 ml/g, an average pore diameter of 85 Å, a pore distribution of 81%, and a closest-packing bulk density (CBD: compacted bulk density) of 0.83 g/ml.

PRODUCTION EXAMPLE 2

Catalyst for First Step:

A silica-alumina support (50.00 g) having a pore volume of 0.70 ml/g, a specific surface area of 359 m$^2$/g, and an average pore diameter of 70 Å (silica/alumina weight ratio= 1/99) was impregnated with an aqueous solution prepared by dissolving 16.3542 g of ammonium paramolybdate in 38.5 g of ion-exchanged water. This support was held at about 25° C. for about 2 hours, subsequently air-dried, and then calcined in a muffle furnace at 500° C. for 4 hours.

Subsequently, the support was impregnated with an aqueous solution prepared by dissolving 5.6084 g of nickel nitrate in 38.5 g of ion-exchanged water. This support was held at about 25° C. for about 2 hours, subsequently air-dried, and then calcined in a muffle furnace at 500° C. for 4 hours to obtain Catalyst ii.

Catalyst ii contained NiO (5 wt %)-MoO3 (20 wt %)-P$_2$O$_5$ (3 wt %)/SiO$_2$—Al$_2$O$_3$ (72 wt %), and had a specific surface area of 248 m$^2$/g, a pore volume of 0.52 ml/g, an average pore diameter of 87 Å, a pore distribution of 78%, and a CBD of 0.82 g/ml.

EXAMPLE 8

Catalyst for Second Step:

A silica-alumina (37.60 g) having a pore volume of 0.71 ml/g and a specific surface area of 363 m$^2$/g (silica/alumina weight ratio=20/80; columnar molding having a diameter of 1/16 inch; acid amount, 0.66 mmol/g) was impregnated with a solution prepared by dissolving 0.50 g of chloroplatinic acid hexahydrate and 0.63 g of palladium chloride in 31.26 g of 10% aqueous hydrochloric acid solution. The silica-alumina impregnated was held at about 25° C. for 2 hours, subsequently air-dried, and placed in a muffle furnace, in which the silica-alumina was first dried at 120° C. for about 1 hour and then calcined at 500° C. for 4 hours. Thus, Catalyst I was obtained.

Catalyst I contained Pt (0.51 wt %)-Pd (0.97 wt %)-Cl (0.57 wt %)/$SiO_2Al_2O_3$ (97.95 wt %), and had a specific surface area of 282 m$^2$/g, a pore volume of 0.73 ml/g, an average pore diameter of 67 Å, a pore distribution of 74%, an acid amount of 0.47 mmol/g, a γ-alumina crystallite diameter of 33 Å, a metal dispersion degree of 60%, a Pt—Pt coordination number of 4.2, and a Pd—Pd coordination number of 1.4.

EXAMPLE 9

Catalyst for Second Step:

A boria-alumina (37.60 g) having a pore volume of 0.74 ml/g and a specific surface area of 374 m$^2$/g (boria/alumina weight ratio=10/90; columnar molding having a diameter of 1/16 inch; acid amount, 0.66 mmol/g) was impregnated with a solution prepared by dissolving 0.50 g of chloroplatinic acid hexahydrate and 0.63 g of palladium chloride in 51.95 g of 10% aqueous hydrochloric acid solution. This boria-alumina was held, air-dried, dried, and calcined under the same conditions as in Production Example 1. Thus, Catalyst II was obtained.

Catalyst II contained Pt (0.50 wt %)-Pd (0.99 wt %)-Cl (0.48 wt %)/$B_2O_3$—$Al_2O_3$ (98.03 wt %), and had a specific surface area of 325 m$^2$/g, a pore volume of 0.48 ml/g, an average pore diameter of 70 Å, a pore distribution of 75%, an acid amount of 0.52 mmol/g, a γ-alumina crystallite diameter of 29 Å, and a metal dispersion degree of 53%.

COMPARATIVE EXAMPLE 8

An alumina (37.60 g) having a pore volume of 0.73 ml/g and a specific surface area of 380 m$^2$/g (columnar molding having a diameter of 1/16 inch; acid amount, 0.66 mmol/g) was impregnated with a solution prepared by dissolving 0.50 g of chloroplatinic acid hexahydrate and 0.63 g of palladium chloride in 51.95 g of 10% aqueous hydrochloric acid solution. This alumina was held, air-dried, dried, and calcined under the same conditions as in Production Example 1. Thus, Catalyst III was obtained.

Catalyst III contained Pt (0.50 wt %)-Pd (1.00 wt %)-Cl (0.43 wt %)/$Al_2O_3$ (98.07 wt %), and had a specific surface area of 320 m$^2$/g, a pore volume of 0.65 ml/g, an average pore diameter of 70 Å, a pore distribution of 75%, an acid amount of 0.41 mmol/g, a γ-alumina crystallite diameter of 41 Å, and a metal dispersion degree of 50%.

COMPARATIVE EXAMPLE 9

A silica-alumina (37.60 g) having a pore volume of 0.71 ml/g and a specific surface area of 363 m$^2$/g (silica/alumina weight ratio=20/80; columnar molding having a diameter of 1/16 inch; acid amount, 0.66 mmol/g) was impregnated with a solution prepared by dissolving 0.34 g of tetraammineplatinum(II) chloride hydrate and 0.95 g of tetraamminepalladium(II) chloride hydrate in 31.26 g of ion-exchanged water. This silica-alumina was held, air-dried, dried, and calcined under the same conditions as in Production Example 1. Thus, Catalyst IV was obtained.

Catalyst IV contained Pt (0.49 wt %)-Pd (1.01 wt %)-Cl (0.41 wt %)/$SiO_2$—$Al_2O_3$ (98.09 wt %), and had a specific surface area of 290 m$^2$/g, a pore volume of 0.66 ml/g, an average pore diameter of 66 Å, a pore distribution of 73%, an acid amount of 0.46 mmol/g, a γ-alumina crystallite diameter of 33 Å, and a metal dispersion degree of 15%.

COMPARATIVE EXAMPLE 10

An H-type zeolite USY (37.29 g) having a pore volume of 0.54 ml/g and a specific surface area of 582 m$^2$/g (silica/alumina molar ratio in the zeolite=36; unit cell size=24.18 Å; acid amount, 0.08 mmol/g) was impregnated with a solution prepared by dissolving 0.50 g of chloroplatinic acid hexahydrate and 0.31 g of palladium chloride in 22.10 g of 10% aqueous hydrochloric acid solution. This zeolite was held, air-dried, dried, and calcined under the same conditions as in Production Example 1. Thus, Catalyst V was obtained.

Catalyst V contained Pt (0.51 wt %)-Pd (0.50 wt %)-Cl (0.34 wt %)/zeolite (98.65 wt %), and had a specific surface area of 484 m$^2$/g, a pore volume of 0.49 ml/g, and an acid amount of 0.06 mmol/g.

EXAMPLE AND COMPARATIVE EXAMPLES 11 TO 13

Examples of Hydrotreating of Gas Oil:

A treatment for feedstock oil quality improvement was performed using Catalyst i for first-step use prepared in Production Example 1 given above and using Catalyst I for second-step use prepared in Example 8 (Example 10) or the comparative catalysts III, IV, and V for second-step use prepared in Comparative Examples 8, 9, and 10 (Comparative Examples 11 to 13).

As the feedstock oil, straight-run gas oil having the following properties was used.

The first step was carried out under the following conditions using a fixed-bed flow-through type high-pressure reactor.

A degassing step was carried out using a gas stripper.

The second step was carried out under the following conditions using a fixed-bed flow-through type high-pressure reactor.

Catalyst i for first-step use and Catalysts I, III, IV, and V for second-step use were subjected to presulfurization and a hydrogenation reduction treatment, respectively, under the following conditions.

Properties of Feedstock Oil:
  Kind of Oil:
    straight-run gas oil from Middle East crude
  Specific gravity (15/4° C.): 0.8567
  Distillation characteristics:
    Initial boiling point: 203.0° C.
    50% point: 315.5° C.
    90% point: 371.0° C.
    End point: 389.0° C.
  Sulfur components: 1.364 wt %
  Aromatic components: 33.5 vol %
  Nitrogen components: 150 ppm
  Dynamic viscosity (@30° C.): 6.608 cSt
  Pour point: 5.0° C.
  Cloud point: 6.0° C.
  Cetane index: 57.1
  Saybolt color: −10
  ASTM color: 0.5

Aniline point: 74.3
First Step:
  Reaction temperature: 340° C.
  Pressure (hydrogen partial pressure): 4.9 MPa
  Liquid hourly space velocity: 1.5 h$^{-1}$
  Hydrogen/oil ratio: 560 L/L
Second Step:
  Hydrogen partial pressure: 4.9 MPa
  Atmosphere: in hydrogen gas stream
  Temperature:
    stepwise heating comprising 1.5-h holding at 150° C. and subsequent 2-h holding at 300° C.
Pretreatment Conditions for the Catalyst for First-Step:
  Pressure: ordinary pressure
  Atmosphere:
    in hydrogen disulfide (5%)/hydrogen gas stream
  Temperature:
    stepwise heating comprising 0.5-h holding at 150° C. and subsequent 1-h holding at 350° C.
Pretreatment Conditions for the Catalysts for Second-Step:
  Hydrogen partial pressure: 4.9 MPa
  Atmosphere: in hydrogen gas stream
  Temperature:
    stepwise heating comprising 1.5-h holding at 150° C. and subsequent 2-h holding at 300° C.

The results of the reactions were analyzed by the following method.

Reactions were initiated under the conditions shown above. At the time when 8 days had passed since the reaction initiation, the treated oil obtained through the first step (hereinafter referred to as "treated oil") and the product oil obtained through the second step (hereinafter referred to as "product oil") were sampled. These samples were analyzed for properties to determine the degree of desulfurization, desulfurization reaction rate constant, degree of dearomatization, dearomatization reaction rate constant, etc. in the same manner as described above.

Incidentally, the higher the reaction rate constant, the better the catalytic activity. The results obtained are as shown in Table 4.

TABLE 4

| Catalyst | First step i treated oil | Example 10 | Comparative Example 11 | Comparative Example 12 | Comparative Example 13 |
|---|---|---|---|---|---|
| | | Second step | | | |
| | | I | III | IV | V |
| | | product oil | | | |
| Sulfur Content (wt ppm) | 395 | 42 | 296 | 330 | 298 |
| Degree of desulfurization (%) | | 89.4 | 25.1 | 16.5 | 24.6 |
| Desulfurization rate constant | | 3.4 | 0.43 | 0.27 | 0.42 |
| Aromatic content (vol %) | 25.7 | 6.7 | 21.5 | 23.4 | 22.2 |
| Degree of dearomatization (%) | | 73.9 | 17 | 8.9 | 13.6 |
| Dearomatization rate constant | | 2.02 | 0.28 | 0.14 | 0.22 |
| Saybolt color | +2.0 | +30 | +17 | +12 | +11 |

EXAMPLE 11

A treatment for feedstock oil quality improvement was performed in the same manner as in Example 10, except that Catalyst ii for first-step use prepared in Production Example 2 given above was used, the reaction temperature in the first step was changed to 350° C., and Catalyst II for second-step use prepared in Example 9 was used. The results of the reactions were analyzed, and the results are shown in Table 5.

TABLE 5

| Catalyst | First step ii treated oil | Second step II product oil |
|---|---|---|
| Sulfur content (wt ppm) | 221 | 11 |
| Degree of desulfurization (%) | | 95 |
| Desulfurization rate constant | | 4.50 |
| Aromatic content (vol %) | 24.2 | 3.8 |
| Degree of dearomatization (%) | | 84.3 |
| Dearomatization rate constant | | 2.78 |
| Saybolt color | +5.0 | +30 |

COMPARATIVE EXAMPLE 14

The second step (ultra-deep desulfurization) treatment was directly performed in the same manner as in Example 10, except that the first step and the degassing step were omitted and Catalyst II for second-step use was used.

At 10 hours after initiation of the reaction, the oil was sampled to determine the sulfur content. As a result, the sulfur content was found to be 1.12 wt %, showing that the desulfurization reaction had not proceeded sufficiently.

COMPARATIVE EXAMPLE 15

A treatment for feedstock oil quality improvement was performed in the same manner as in Example 10, except that the liquid hourly space velocity, among the desulfurization step conditions shown below, was changed to 5.2 h$^{-1}$. The results of the reactions were analyzed, and the results are shown in Table 6.

TABLE 6

| Catalyst | First step i treated oil | Second step I product oil |
|---|---|---|
| Sulfur content (wt ppm) | 3063 | 2180 |
| Degree of desulfurization (%) | | 28.8 |
| Desulfurization rate constant | | 0.5 |
| Aromatic content (vol %) | 26.2 | 21.8 |
| Degree of dearomatization (%) | | 16.8 |
| Dearomatization rate constant | | 0.28 |
| Saybolt color | +2.0 | +27 |

Tables 4 to 6 and Comparative Example 14 show the following. Although the second step was carried out under the same conditions in the Examples and Comparative Examples, the contents of aromatic compounds and sulfur-containing compounds in the product oil were considerably lower in Examples 10 and 11 than in Comparative Examples 11 to 13.

This indicates that the second step in the present invention, in which the catalyst proposed above is used, is effective in the ultra-deep desulfurization reaction of a gas oil carried out at almost the same hydrogen partial pressure and reaction temperature as in conventional hydrotreating steps.

REFERENCE EXAMPLE 1

Using a feedstock oil having the properties shown below (one obtained by desulfurizing mixed oil containing 70 vol % straight-run gas oil and 30 vol % FCC light cycle oil), an accelerated deactivation test of Catalyst I (300-day operation at a hydrogen partial pressure of 4.9 MPa, a liquid hourly space velocity of 1.5 h$^{-1}$, and a hydrogen/oil ratio of 560 L/L, with the aromatic content in the product oil kept at 20 vol %) was carried out Properties of Feedstock Oil;

Aromatic content (vol %): 34.0

Saybolt color: −5.6

Cetane index: 52.8

Sulfur content (wt ppm): 420

Subsequently, the catalyst deactivated through the test described above was subjected to the hydrotreatment of feedstock oil in the same manner as in Example 10. The results of the reactions were analyzed, and the results are shown in Table 7.

Table 7 shows that the catalyst which had undergone the test described above had considerably deactivated as compared with the fresh catalyst.

TABLE 7

| Catalyst | First step i treated oil | Second step catalyst I after deactivation test product oil |
|---|---|---|
| Sulfur content (wt ppm) | 395 | 250 |
| Degree of desulfurization (%) | | 36.7 |
| Desulfurization rate constant | | 0.68 |
| Aromatic content (vol %) | 25.7 | 19.8 |
| Degree of dearomatization (%) | | 24.2 |
| Dearomatization rate constant | | 0.41 |
| Saybolt color | +2.0 | +12 |

EXAMPLE 12

Catalyst I which had undergone the deactivation test described above was regenerated by the following method.

Catalyst I described above was regenerated in a muffle furnace for 4 hours at an air partial pressure of 0.1 MPa and 500° C. to obtain Catalyst X.

Catalyst X contained Pt (0.49 wt %)-Pd(0.95 wt %)-Cl (0.22 wt %)/SiO$_2$—Al$_2$O$_3$ (98.34 wt %), and had a specific surface area of 243 m$^2$/g, a pore volume of 0.71 ml/g, an average pore diameter of 72 Å, a pore distribution of 73%, an acid amount of 0.42 mmol/g, a γ-alumina crystallite diameter of 37 Å, and a metal dispersion degree of 49%.

EXAMPLE 13

Catalyst X described above was packed into a flow-through type reactor, and was regenerated by treatment with a temperature of 500° C. for 4 hours while introducing, at ordinary pressure, hydrogen gas at a flow rate of 50 L/h and 5% aqueous hydrochloric acid solution. Thus, Catalyst Y was obtained.

Catalyst Y contained Pt (0.47 wt %)-Pd(0.93 wt %)-Cl (0.72 wt %)/SiO$_2$—Al$_2$O$_3$ (97.88 wt %), and had a specific surface area of 241 m$^2$/g, a pore volume of 0.73 ml/g, an average pore diameter of 71 Å, a pore distribution of 73%, an acid amount of 0.49 mmol/g, a γ-alumina crystallite diameter of 35 Å, and a metal dispersion degree of 63%.

EXAMPLE 14

Using the regenerated catalysts X and Y described above, a treatment for feedstock oil quality improvement was performed in the same manner as in Example 8. The results of the reactions were analyzed, and the results are shown in Table 8.

Table 7 shows that Catalysts X and Y had recovered their activity.

TABLE 8

| | First step | Example 14 Second step | |
|---|---|---|---|
| Catalyst | i treated oil | X product oil | Y product oil |
| Sulfur content (wt ppm) | 395 | 49 | 43 |
| Degree of desulfurization (%) | | 87.6 | 89.1 |
| Desulfurization rate constant | | 3.1 | 3.3 |
| Aromatic content (vol %) | 25.7 | 11.8 | 6.9 |
| Degree of dearomatization (%) | | 56.2 | 75.2 |
| Dearomatization rate constant | | 1.24 | 2.09 |
| Saybolt color | +2.0 | +27 | +30 |

INDUSTRIAL APPLICABILITY

According to the present invention, the sulfur-containing compounds contained in gas oil which are unsusceptible to desulfurization can also be practically hydrotreated, whereby high-quality gas oil having a sulfur content of 10 ppm or lower and further having a low aromatic content can be efficiently produced. In addition, since the catalyst can be repeatedly regenerated in the present invention, the running cost can be considerably reduced as compared with conventional techniques for deep desulfurization. The present invention is hence capable of converting, at low cost, straight-run gas oil or blend oil comprising this straight-run gas oil and at least one other hydrocarbon oil into high-quality gas oil capable of being fully compatible with strict regulation values.

What is claimed is:

1. A catalyst for hydrotreatment of gas oil, comprising from 0.1 to 10% by weight platinum, from 0.1 to 20% by weight palladium, and from 0.05 to 1.2% by weight halogen in terms of the respective elements based on the catalyst in a support comprising an inorganic oxide containing an alumina, wherein the alumina comprises a crystalline alumina having a crystallite diameter of from 20 to 40 Å.

2. The catalyst according to claim 1, wherein the weight ratio between the platinum and the palladium is from 0.5 to 0.8 in terms of (palladium)/(palladium+platinum) ratio.

3. The catalyst according to claim 1 or 2, wherein the support contains at least one inorganic oxide selected from silica, boria, titania, and zirconia in an amount of from 5 to 60% by weight.

4. The catalyst according to claim 1, which has an acid amount as determined by the ammonia-TPD method of from 0.4 to 3 mmol/g.

5. The catalyst according to any claim 1, wherein the metal dispersion degree of the catalyst as determined by the CO pulse method after a hydrogen reduction treatment is from 40 to 100%.

6. A method for hydrotreating gas oil, comprising carrying out a catalytic reaction of a gas oil fraction containing an aromatic compound in the presence of the catalyst according to claim 1 at a hydrogen partial pressure of from 3 to 8 MPa, a temperature of from 200 to 370° C., a liquid hourly space velocity of from 0.3 to 5.0 h$^{-1}$, and a hydrogen/oil ratio of from 100 to 1,000 L/L.

7. A method for hydrotreating gas oil, comprising:

carrying out, as a first desulfurization step, a catalytic reaction of straight-run gas oil having a boiling point of from 160 to 400° C. or blend oil comprising the straight-run gas oil and at least one other hydrocarbon oil at a hydrogen partial pressure of from 3 to 7 MPa, a temperature of from 200 to 400° C., a liquid hourly space velocity of from 0.5 to 5.0 h–1, and a hydrogen/oil ratio of from 100 to 1,000 L/L in the presence of a catalyst comprising from 10 to 25% by weight of at least one metal selected from the Group 6a of the periodic table and from 0.1 to 6% by weight at least one metal selected from the Group 8 of the periodic table in terms of the respective oxides based on the catalyst in a support comprising an inorganic oxide to thereby regulate the oil so as to have a sulfur-containing compound content of 0.2% by weight or lower after the step; and then carrying out, as a second desulfurization step, a catalytic reaction of the oil after the first desulfurization step at a hydrogen partial pressure of from 3 to 8 MPa, a temperature of from 150 to 370° C., and a liquid hourly space velocity of from 0.3 to 5.0 h$^{-1}$ in the presence of a catalyst comprising from 0.1 to 10% by weight platinum, from 0.1 to 20% by weight palladium, and from 0.05 to 1.2% by weight halogen in terms of the respective elements based on the catalyst in a support comprising an inorganic oxide containing an alumina, wherein the alumina comprises a crystalline alumina having a crystalline diameter of from 20 to 40 Å.

8. The method according to claim 7, wherein after the first desulfurization step, the oil is subjected to a degassing step.

9. The method according to claim 7, wherein in the catalyst for use in the second desulfurization step, the weight ratio between the platinum and the palladium is from 0.5 to 0.8 in terms of (palladium)/(platinum+palladium) ratio.

10. The method according to claim 7, wherein the support of the catalyst for use in the second desulfurization step contains at least one inorganic oxide selected from silica, boria, titania, and zirconia in an amount of from 1 to 60% by weight.

11. The method according to claim 7, wherein the catalyst for use in the second desulfurization step has an acid amount as determined by the ammonia-TPD method of from 0.4 to 3 mmol/g.

12. The method according to claim 7, wherein the catalyst for use in the second desulfurization step, after a hydrogen reduction treatment, has a metal dispersion degree as determined by the CO pulse method of from 40 to 100%.

13. The method according to claim 7, wherein the catalyst for use in the second desulfurization step is one regenerated by carrying out a reaction for coke deposit removal at an air partial pressure of from 0.05 to 5 MPa and a temperature of from 200 to 800° C.

14. The method according to claim 7, wherein the catalyst for use in the second desulfurization step is one regenerated by carrying out a reaction for coke deposit removal at an air partial pressure of from 0.05 to 5 MPa and a temperature of from 200 to 800° C. and then carrying out a treatment for highly dispersing an active metal in the presence of a chlorine compound at a temperature of from 200 to 800° C.

* * * * *